Sept. 2, 1930.  C. W. WEISS  1,774,578
UNIVERSAL JOINT
Filed Oct. 17, 1929
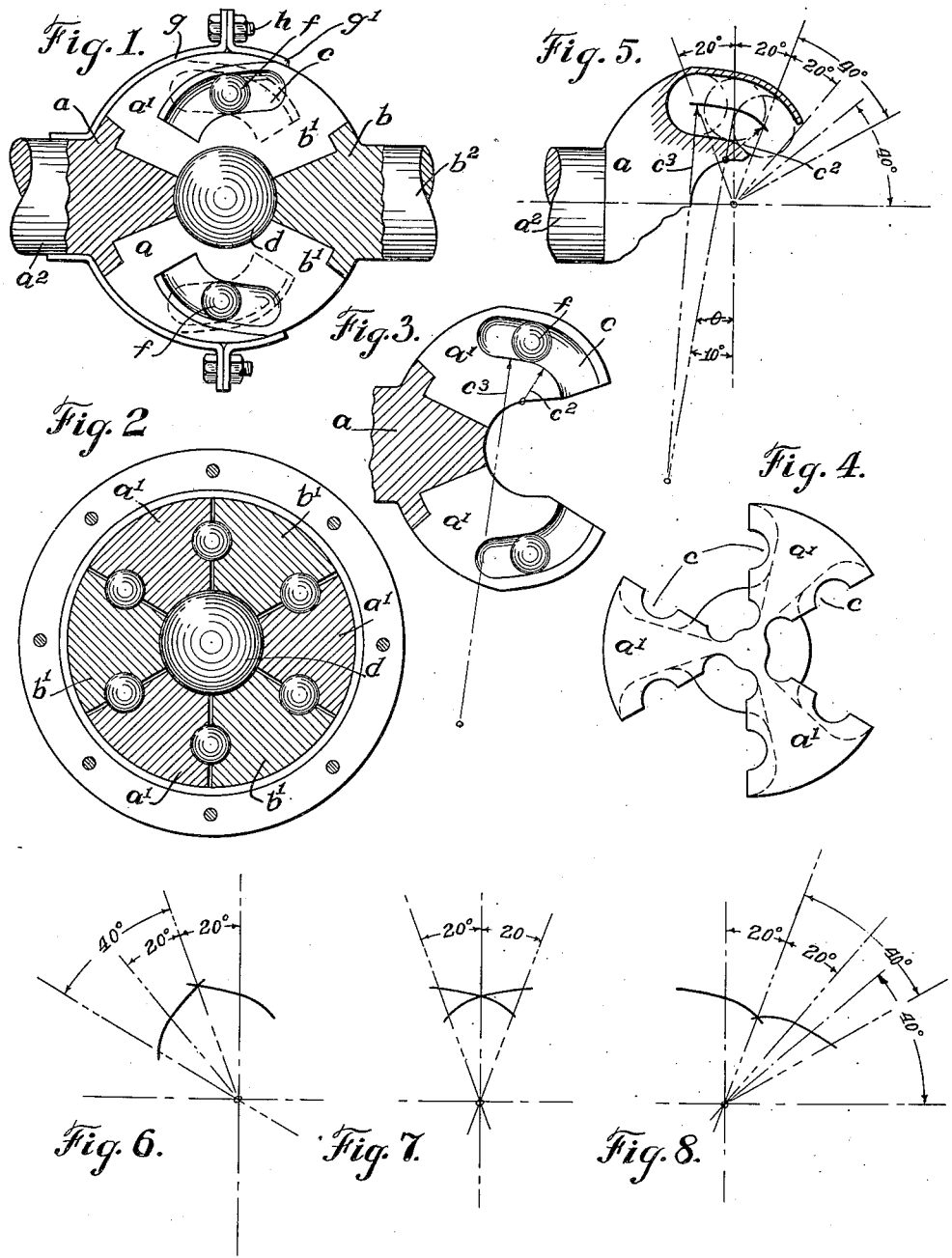

Patented Sept. 2, 1930

1,774,578

UNITED STATES PATENT OFFICE

CARL W. WEISS, OF BROOKLYN, NEW YORK

UNIVERSAL JOINT

Application filed October 17, 1929. Serial No. 400,200.

This invention relates to universal joints of the character of that shown in Letters Patent of the United States No. 1,522,351 dated January 6, 1925, in which the two members capable of relative angular displacement have co-acting portions with proximate faces formed with non-concentric grooves with their longitudinal axes intersecting at an angle and a relatively movable body received partly in each of such grooves and through which force is transmitted from one co-acting portion to the other, such relatively movable body lying always in a plane which bisects the angle of displacement of the two members, whereby relative fluctuation of angular velocity of the driven member as compared with that of the driving member is prevented. In the joint shown and described in said patent the curved axes of the intersecting grooves are shown as struck on centers which lie in the axes of the two elements of the joint but respectively some distance from and on opposite sides of the center of angular displacement of the two members, the radii being of fixed length. In such construction the angle of intersection of the two grooves is at its maximum when the axes of the two joint members are in alignment and the wear upon the balls or movable bodies is also at a maximum. When the angle of displacement of the two joint members does not much exceed 15°, as in the application of such a joint to a propeller shaft in the conventional rear wheel drive of automobiles, the problems of reduction of wear is not of great importance, but when the relative angular displacement of the two members of the joint is much larger than 15°, as in the application of universal joints to the front wheel drive of automobiles and provision for angular displacement of 35° or 40° must be made, for example, the angle of intersection of the grooves or races must also be increased for the extreme positions of the balls in their races, being approximately 54° for a 40° joint. When, however, the joint members are nearly in alignment, as they are during perhaps 90% of the mileage of a front wheel drive, so great an angle of intersection of the races is unnecessary. It has, therefore, been the object of the present invention so to improve the construction of such joints, particularly those intended for use in front wheel drives, that the large angle of intersection of the grooves or races necessary for large angular displacement of the joint members shall be possible and at the same time the wear of the balls and races, during small angular displacement of the joint members, shall be prevented and the life of the joint be thereby prolonged. Accordingly, the intersecting grooves or races in the proximate faces of the projecting portions or teeth of the joint members and in which are placed the balls or movable bodies through which force is transmitted from one co-acting portion to another are struck on varying radii, the curve being a compound curve generated upon variable radii.

The invention will be more fully explained hereinafter with reference to the accompanying drawing in which it is illustrated and in which:

Figure 1 is a view in longitudinal section through a universal joint which embodies the invention, the intermediate, relatively movable balls or bodies, the central, spherical supporting member and the shafts, which are broken off to save space, being shown in elevation.

Figure 2 is a view in transverse, sectional elevation of the joint shown in Figure 1.

Figure 3 is a view in longitudinal, sectional elevation of one of the members of the joint.

Figure 4 is a view in end elevation of the member shown in Figure 3.

Figure 5 is a diagrammatic view illustrating the formation of one of the grooves or races.

Figures 6, 7 and 8 are diagrammatic views illustrating, by single lines, the relations of the grooves or races in the two extreme and middle positions of angular displacement of the joint members.

In the embodiment of the invention illustrated in the drawing the driving member $a$ of the joint is formed with three projecting portions or teeth $a^1$ with radial faces and designed to co-act with corresponding projecting portions $b^1$ of the other or driven member $b$. The members $a$ and $b$ are shown as formed integral with the shaft portions $a^2$ and $b^2$ respectively, and the two members are shown as centered upon a spherical bearing $d$. In the proximate face of each projecting portion or tooth $a^1$, $b^1$, of the two members $a$, $b$, there is formed a groove or race $c$. The two grooves of the two proximate faces of co-acting portions or teeth of the joint members are formed, as described in said patent, so that their longitudinal axes are non-concentric or are oppositely disposed with respect to each other so that they intersect, in all positions of angular displacement of the joint members, in a plane which bisects the angle of displacement of the two members. Force is transmitted from one member of the joint to the other, not through contact of the proximate faces of the co-acting portions or teeth of the two members, but through the intermediate and relatively movable body which is shown as a roller or ball $f$. The two members of the joint may be retained in operative relation by partly spherical, flanged shells $g$ and $g^1$ and bolts $h$. Except as to the curvature of the grooves or races $c$ all of the parts thus far referred to may be arranged and operate in the same manner as in the universal joint shown and described in said patent.

In accordance with the present invention, as shown in Figures 1, 3, 5, 6, 7 and 8, and particularly in Figure 5, each groove or race $c$ is formed upon a compound curve which is best described with reference to its longitudinal axis, indicated by the line $c^1$ in Figures 5, 6, 7 and 8. This curve is struck from different centers upon variable radii. Thus, the first part of the curve, at the righthand in Figure 5, is formed upon a short radius, indicated by the broken line $c^2$, while the curve at the lefthand is formed upon a long radius, indicated by the broken line $c^3$. The radius of curvature increases from the radius $c^2$ to the radius $c^3$. In the operation of the joint, when the longitudinal axes of the joint members are in alignment, the longitudinal axes of the grooves intersect with the included angle of intersection at its minimum, as shown in Figure 7, but when the angle of displacement is at its maximum, say 40°, the relations of the two longitudinal axes are as shown in Figures 6 and 8, Figure 6 illustrating the relations of the axes at one side of the joint and Figure 8 illustrating the relations at the opposite side of the joint, both in the plane of displacement. It will clearly appear, upon inspection of these Figures 6, 7 and 8, that by reason of the curvature of the grooves or races, as described, the angle of intersection of the grooves or races will be at its minimum when the joint members are in alignment and will be at its maximum when the angular displacement of the two joint members is at its maximum. Under these circumstances, as already explained, the frictional resistance of the joint and the wear of the balls and co-acting parts will be small when the two joint members are in or nearly in alignment, as they will be during about 90% of the mileage of the joint and that as the angle of displacement of the joint members increases the angle of intersection of the grooves or races will increase to satisfy the requirements of the greater angular displacement of the joint members.

It will be observed that as that portion of each groove which is most remote from the center of the joint is formed on a radius greater than the portion which is nearest the center the groove is curved somewhat sharply near its open end, whereby the portions of the two intersecting grooves, nearer the center of the joint, intersect at a greater angle, as shown in Fig. 8. This prevents the ball from dropping out of the open ends of the grooves which might occur at certain points in the rotation of the joint when the angular displacement of the joint approaches its maximum.

I claim as my invention:

A universal joint having two members capable of relative angular displacement and having co-acting portions with their proximate faces formed with non-concentric grooves intersecting at an angle and a relatively movable body received partly in each of such grooves and through which force is transmitted from one co-acting portion to the other, each groove being curved as a compound curve generated upon variable radii with the portions of the grooves near the open ends curved so that such portions intersect at a greater angle.

This specification signed this 10th day of October, A. D. 1929.

CARL W. WEISS.